Patented May 15, 1951

2,552,896

UNITED STATES PATENT OFFICE 2,552,896

METHANOL EXTRACTION OF CASCARA SAGRADA BARK

John Lee, Essex Fells, and Leo Berger, Nutley, N. J., assignors to Hoffmann-La Roche Inc., Nutley, N. J., a corporation of New Jersey No Drawing. Application September 18, 1948, Serial No. 49,995

6 Claims. (Cl. 260—210)

The present invention relates to a new glycosidal material which has been named and will hereinafter be referred to as casanthranol. The compound has the following empirical formula: $C_{33}H_{42}O_{18}.2H_2O$ and has been prepared from *Rhamnus purshianus* (cascara sagrada) bark. It is obtained as a hygroscopic bright yellow powder which separates from isopropanol in minute spheroids. Contrary to the glycosides heretofore obtained from cascara bark, the new compound is very water-soluble and has no bitter flavor, but a sweet taste.

The drug cascara sagrada has been an object of intensive investigations for a great number of years, and various materials have been isolated from the drug, among which are emodin, isoemodin, aloe-emodin, frangulin, and others.

It is acknowledged in the literature that these compounds do not account for more than a slight fraction of the cathartic activity of the drug, since individually they have only slight activity and occur only in very small amounts. The new compound not only differs in its constitution and in the amounts in which it occurs, which is as much as 9–10 per cent of the weight of the dried bark, but also in its activity which accounts for practically the whole of the laxative effect of the bark. We have found that 100 mg. of casanthranol is equivalent to about 1 gram of the powdered bark when administered to human adults.

The new glycoside is entirely free from the natural bitter taste of cascara bark or extract. Its uniformity and its smaller bulk make it more practical and convenient for pharmaceutical preparations. It is free from the side effects of the free anthraquinones and bitter stuffs and does not cause nausea and griping.

Casanthranol differs in its constitution from the glycosides hitherto isolated from cascara. Frangulin is an isoemodin rhamnoside and contains no glucose. The emodin gluco-rhamnoside of Beal et al., J. A. Ph. A., 27:95 contains a molecule each of glucose and rhamnose in the non-aglycone fraction. Casanthranol contains no rhamnose, but contains one glucose residue per molecule of the compound. This, however, comprises only a fraction of the non-aglycone portion of the molecule and amounts to only 23.5 per cent of the weight of the casanthranol. The remainder of the non-aglycone portion is not a sugar. Moreover, the aglycone in casanthranol is aloe-emodin and not emodin or isoemodin which occurs in the hitherto known glycosides.

According to the present invention, the method for obtaining casanthranol comprises extracting cascara sagrada bark with benzol containing five per cent of ethanol to remove fats, phytosterols, chlorophyll, anthraquinones, and the like from the bark. Other solvents can be employed for this purpose, such as acetone, methyl ethyl ketone, ether, petroleum ether, methylene dichloride, chloroform, and carbon tetrachloride, with or without added ethanol. The thus defatted marc is extracted by percolation or maceration with methanol. The methanol percolate, after concentration, is then run into a solvent in which casanthranol is insoluble such as a ketone, for example, acetone and ethylmethyl ketone or an ester of a lower fatty acid, as for example, ethyl acetate or ethyl formate. This causes the precipitation of casanthranol as a bright yellow powder, which is removed by filtration or by centrifuging. The precipitate is washed with the solvent and dried and can be crystallized from a suitable solvent such as isopropanol or butyl alcohol. The entire extraction procedure is carried out in the substantial absence of water.

Casanthranol is an amorphous or quasi-crystalline material, separating from hot isopropanol in minute spheroids when viewed under high-powered magnification. After drying at 50° C. (in vacuo) it contains 4.5 per cent of moisture corresponding to two molecules of water. The casanthranol thus obtained shows a constant carbon and hydrogen content and corresponds to the formula $C_{33}H_{42}O_{18}.2H_2O$. The compound has no definite melting point, the melting point being dependent upon the rate of heating and the degree of moisture absorption. It is water-soluble and has an optical rotation of $[\alpha]_D^{26} = -34.3$ $C=1.0$ $CH_3OH$ (moisture 5.76 per cent at 110° C.).

Casanthranol, on acetylation and benzoylation, forms a casanthranol dodeca-acetate and a casanthranol dodeca-benzoate. It also forms a precipitate with a methanolic solution of neutral lead acetate in the presence of methanolic ammonia solution. The lead salt so obtained can be suspended in methanol and resolved with hydrogen sulfide. By this means, the mother liquors from the precipitation with the ketones can be worked up and further amounts of casanthranol obtained therefrom.

Casanthranol undergoes partial hydrolysis in cold aqueous solutions within a few hours. The clear solutions become turbid and then form a deposit. Because of the tendency of casanthranol to hydrolyze, the whole extraction procedure is carried out in the substantial absence of water. The pharmacopoeial procedures employ water in preparing cascara extracts. Hence the activity of the pharmacopoeial extracts is not due to casanthranol per se, but more likely to its decomposition products.

Casanthranol is apparently a glycoside of aloe-emodin anthranol containing one glucose moiety per molecule of casanthranol. The remainder of the structure is not completely clarified, but appears to consist of a methyl tetrahydroxy pentonic acid lactone and a hexitol residue. The position of the attachment of the residues to the anthranol hydroxy groups is unknown. A provisional structural formula for casanthranol can be written as follows:

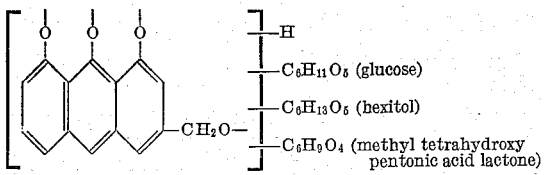

The following examples will serve to illustrate our invention:

EXAMPLE 1

4500 grams of commercial cascara sagrada bark were ground to a number 20-mesh powder and extracted at 20° C. with 20 liters of benzol containing 5 per cent of absolute ethanol in a continuous extractor for 36 hours. This yielded about 250–300 grams of dark green extract which had no cathartic activity. The marc was separated and dried and then packed in a percolator and extracted to exhaustion with 60 liters of methanol. The methanol percolate was concentrated in vacuo at 40° C. to a volume of 5 liters. This was added in a thin stream with vigorous stirring to 50 liters of dry acetone. A bright yellow precipitate resulted which was filtered off and washed with ice cold isopropanol. While still wet, it was introduced into 2,000 cc. of isopropanol and extracted by bringing to a boil with good stirring and no local overheating. The suspension was quickly filtered and the filtrate cooled. A yellow solid that separated from the filtrate was filtered off and dried in vacuo. The isopropanol soluble fraction weighed 157 grams. The insoluble fraction weighing 278 grams was reextracted with two 2,000 and one 1,500 cc. portions of isopropanol. The filtrate was cooled, filtered and further amounts of isopropanol-soluble material were obtained. The residue of the filtrate was again reextracted in the same way until finally a total of 357 grams of casanthranol was obtained from the isopropanol solutions.

For the recovery of casanthranol remaining in the mother liquors, the methanol-acetone filtrate was evaporated to dryness in vacuo at 50° C. and the residue taken up in 2,500 cc. of methanol. This was then treated with 200 grams of neutral lead acetate in 2 liters of methanol and the precipitate obtained was filtered, washed with methanol, resuspended in 2 liters of methanol and decomposed with hydrogen sulfide. The lead sulfide was filtered off and the filtrate evaporated in vacuo, yielding a golden brown powder which on recrystallization from isopropanol weighed 23.4 grams. The constitution of this material has not yet been established. The filtrate from the neutral lead acetate precipitate was brought to a pH 9 with alcoholic ammonia. A bulky precipitate formed and 400 grams of lead acetate in 2 liters of methanol were added to complete the precipitation of the basic lead salts. This salt was filtered off, washed with methanol, resuspended in methanol and decomposed with hydrogen sulfide. The filtrate on evaporation yielded a bright yellow powder which on extraction with boiling isopropanol, gave an additional 12.2 grams of casanthranol.

CASANTHRANOL

*Analysis*

$C_{33}H_{42}O_{18} \cdot 2H_2O$ (M. W. 762), C=51.98; H=6.04
Found:

| | | |
|---|---|---|
| C=51.88 | H=5.72 | Dried at 100° in vacuo |
| C=51.88 | H=6.11 | Dried at 50° in vacuo |
| C=51.71 | H=6.34 | Dried at 50° in vacuo |

*Rotation*

$[\alpha]_D^{26} = -34.3°$    C=1% ($CH_3OH$)

Moisture in sample: 5.76% $H_2O$ when dried at 110° over $P_2O_5$ to constant weight.

The following examples will serve to illustrate the preparation of casanthranol dodeca-acetate and dodeca-benzoate.

EXAMPLE 2

6 grams of casanthranol were acylated with 32 cc. of acetic anhydride in 50 cc. of dry pyridine at 5–10° C. and finally at 20–30° C. for twelve hours. On completion of the reaction, the pyridine solution was poured into 1 liter of ice water and a light yellow powder separated. The insoluble product was washed with water, filtered, air dried and finally dried in vacuo over concentrated sulfuric acid. There was obtained a light yellow, fine powder which was soluble in methyl alcohol, ethyl alcohol, ethyl acetate, benzene, dioxane, chloroform, pyridine, acetic acid and slightly soluble in propanol and less soluble in higher alcohols. The product is completely insoluble in cold or hot water. It was purified by dissolving in alcohol, treatment with decolorizing charcoal and precipitation with water. The amorphous product obtained was brought to a micro-crystalline state (small "cubes") by recrystallization from isopropanol. The purified product is a stable, non-hygroscopic, light yellow powder melting at 90–95° C. (macro) and 108–110° C. (micro). The casanthranol dodeca-acetate has a strong fluorescence in organic solvents, such as benzene.

*Analysis*

Calculated for:
$C_{57}H_{66}O_{30}$ (M. W. 1230)
C=55.60    H=5.36    Acetyl=41.9
Found:
C=55.48    H=5.54    Acetal=41.7
M. W. 1222 (By isothermal distillation)

EXAMPLE 3

3 grams of casanthranol were dissolved in 50 cc. of pyridine and 17 grams of benzoyl chloride added portionwise at 10–15° C. The reaction mixture was left standing at about 20–30° C. for two to three hours. The mixture was then heated at 50° C. for fifteen minutes, cooled and poured into 1 liter of ice water. An oil that separated was dissolved in ether; the ether solution was washed with dilute hydrochloric acid, then water, then with a dilute alkali such as sodium bicarbonate solution and then with water until neutral. The ether solution was dried over anhydrous sodium sulfate, filtered and concentrated to dryness to yield a thick syrup. The syrup was left standing in vacuo over concentrated sulfuric acid for fourteen days, after which time it partially crystallized. This product was then dissolved in a large volume of hot methanol and upon cooling the solution, it crystallized forming a light yellow amorphous product. The compound was hygroscopic and when dried over phosphorus pentoxide at 25° C., it sintered at 114° C. and melted at 120–125° C. The product is soluble in acetone, ether, and ethyl acetate, but is insoluble in water, petroleum ether, ethanol and methanol. It dissolves in large volumes of hot ethanol and methanol to yield an amorphous tacky syrup. The compound on analysis corresponds to the formula for casanthranol dodeca-benzoate.

Analysis

Calculated for: $C_{117}H_{90}O_{30}.2H_2O$
Found:
- C=69.85    H=4.67
- C=69.88    H=4.99

It will be understood that the term "cascara sagrada bark" as employed herein and in the claims embraces not only the untreated bark but bark which may have been preliminarily treated, e. g., to remove fats, chlorophyll, and the like, though yet containing casanthranol. Thus, the term will be understood to cover cascara segrada bark which has been treated preliminarily, e. g., with benzol or similar solvents for defatting purposes.

We claim:

1. A method for obtaining the laxative-active substance, casanthranol, which comprises extracting cascara sagrada bark with a solvent to remove fats, phytosterols, chlorophyll and anthraquinones therefrom, extracting the resulting marc with methanol, and precipitating casanthranol from the methanol extract with a solvent of the group consisting of acetone, ethyl methyl ketone, ethyl acetate, and ethyl formate, the entire extraction procedure being carried out in the substantial absence of water.

2. The new compound casanthranol which is water-soluble, has a sweet taste and a laxative action, and which is obtained according to the process of claim 1.

3. A method of preparing casanthranol which comprises extracting cascara sagrada bark with methanol, the entire process taking place in the absence of water.

4. The product prepared according to the process of claim 3.

5. A method of obtaining casanthranol which comprises extracting cascara sagrada bark with benzol containing 5 per cent of absolute alcohol, extracting the resulting marc with methanol and treating the methanol extract with acetone to precipitate casanthranol, said extraction being carried out in the substantial absence of water.

6. A method as in claim 5 wherein the precipitated casanthranol is recrystallized from isopropanol.

JOHN LEE.
LEO BERGER.

REFERENCES CITED

The following references are of record in the file of this patent:

J. Am. Pharm. Assn., Green et al., v. 25 (1936), pp. 107–110, 4 pages.

J. Am. Pharm. Assn., Green et al., v. 27 (1938), pp. 95–100, 6 pages.

J. Am. Pharm. Assn., Liddell et al., v. 31 (1942), pp. 161–166, 6 pages.

Chem. Abstracts, v. 42 (1948), page 9085.